(12) United States Patent
Sun et al.

(10) Patent No.: US 12,640,453 B2
(45) Date of Patent: May 26, 2026

(54) BATTERY CELL, BATTERY, AND ELECTRICAL DEVICE

(71) Applicant: CONTEMPORARY AMPEREX TECHNOLOGY (HONG KONG) LIMITED, Hong Kong (CN)

(72) Inventors: Jingxuan Sun, Ningde City (CN); Jianfu He, Ningde City (CN); Yonghuang Ye, Ningde City (CN); Qian Liu, Ningde City (CN); Xueyang Sun, Ningde City (CN); Xiaofu Xu, Ningde City (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 161 days.

(21) Appl. No.: 17/965,281

(22) Filed: Oct. 13, 2022

(65) Prior Publication Data

US 2023/0065566 A1 Mar. 2, 2023

Related U.S. Application Data

(63) Continuation of application No. PCT/CN2021/114641, filed on Aug. 26, 2021.

(51) Int. Cl.
*H01M 50/682* (2021.01)
*H01M 50/124* (2021.01)
*H01M 50/342* (2021.01)

(52) U.S. Cl.
CPC ....... *H01M 50/682* (2021.01); *H01M 50/124* (2021.01); *H01M 50/3425* (2021.01)

(58) Field of Classification Search
None
See application file for complete search history.

(56) References Cited

U.S. PATENT DOCUMENTS

| | | | |
|---|---|---|---|
| 10,205,137 B2 | 2/2019 | Uhm et al. | |
| 2003/0049519 A1* | 3/2003 | Ishida | H01M 10/0587 |
| | | | 429/57 |

(Continued)

FOREIGN PATENT DOCUMENTS

| | | |
|---|---|---|
| CN | 103811711 A | 5/2014 |
| CN | 105229823 A | 1/2016 |

(Continued)

OTHER PUBLICATIONS

Notification of Failure to Disclose Information on Prior Art Documents, JP Patent Application No. 2022-562973, dated Jan. 9, 2024.

(Continued)

*Primary Examiner* — Amanda J Barrow
(74) *Attorney, Agent, or Firm* — Ladas & Parry LLP

(57) ABSTRACT

Embodiments of this application provide a battery cell, which includes a housing and an electrode assembly. The electrode assembly is accommodated in the housing. A film structure is arranged at a position located on an inner wall of the housing and opposite to the electrode assembly. The film structure combines with the inner wall of the housing to form a capsule structure. An accommodation cavity is formed inside the capsule structure. In this way, the capsule structure is more space-efficient, and the battery cell is more structurally compact.

11 Claims, 7 Drawing Sheets

(56) References Cited

U.S. PATENT DOCUMENTS

| | | | |
|---|---|---|---|
| 2009/0155354 A1* | 6/2009 | McLean ............... | A61K 9/4866 |
| | | | 424/452 |
| 2009/0202891 A1 | 8/2009 | Morganstein | |
| 2011/0200855 A1* | 8/2011 | Watanabe ................ | F03D 9/11 |
| | | | 29/623.2 |
| 2013/0171483 A1* | 7/2013 | Shibata ................ | H01M 10/52 |
| | | | 429/56 |
| 2014/0154554 A1 | 6/2014 | Kim et al. | |
| 2015/0093635 A1* | 4/2015 | Grimminger ..... | H01M 10/0567 |
| | | | 429/188 |
| 2016/0141565 A1 | 5/2016 | Uhm et al. | |
| 2020/0106123 A1 | 4/2020 | Hu | |
| 2021/0143445 A1* | 5/2021 | Rastegar ................ | H01M 6/36 |
| 2023/0046770 A1* | 2/2023 | Xu ...................... | H01M 50/204 |
| 2023/0065566 A1* | 3/2023 | Sun ..................... | H01M 50/209 |

FOREIGN PATENT DOCUMENTS

| | | | | |
|---|---|---|---|---|
| CN | 106654355 | A | 5/2017 | |
| CN | 109309257 | A | 2/2019 | |
| CN | 110048154 | A | 7/2019 | |
| CN | 209104274 | U | 7/2019 | |
| CN | 110433419 | A | 11/2019 | |
| CN | 209785980 | * | 12/2019 | ........... H01M 10/42 |
| CN | 209785980 | U | 12/2019 | |
| CN | 214013123 | U | 8/2021 | |
| EP | 3866233 | A1 | 8/2021 | |
| JP | 2011165614 | A | 8/2011 | |
| JP | 2011238456 | A | 11/2011 | |
| JP | 2012129009 | A | 7/2012 | |
| JP | 2013105544 | A | 5/2013 | |
| JP | 2015090760 | A | 5/2015 | |
| JP | 2021508141 | A | 2/2021 | |
| JP | 2022101084 | A | 7/2022 | |
| JP | 2023542757 | A | 10/2023 | |
| KR | 20080110679 | A | 12/2008 | |
| KR | 10-2011-0106527 | * | 9/2011 | ........... H01M 10/02 |
| KR | 20110106527 | A | 9/2011 | |
| KR | 20130106796 | A | 4/2013 | |
| KR | 10-2013-0106796 | * | 9/2013 | ........... H01M 10/04 |
| KR | 20130038655 | A | 9/2013 | |
| KR | 20140105454 | A | 9/2014 | |
| KR | 20210079084 | A | 6/2021 | |
| WO | 2013069622 | A1 | 5/2013 | |

OTHER PUBLICATIONS

Decision to Grant a Patent for JP Patent Application No. 2022-562973, dated Jul. 23, 2024.

Notice of Reasons for Refusal for JP Patent Application No. 2022-562973, dated May 7, 2024.

Extended European search report for EP application No. 21936239. 9, dated Sep. 15, 2023.

International Search Report for International Application PCT/CN2021/114641, mailed May 7, 2022.

Written Opinion of International Search Authority for International Application PCT/CN2021/114641, mailed May 7, 2022.

Partial European Search Report for EP application No. 21936239, mailed May 31, 2023.

Notice of Opinion Submission for KR application No. 10-2022-7035446, dated Mar. 13, 2025.

International Search Report for PCT application No. PCT/CN2021/106111, dated Mar. 1, 2022.

Written Opinion of The International Searching Authority for PCT application No. PCT/CN2021/106111, dated Mar. 1, 2022.

Extended European search report for EP application No. 21923588. 4, dated Sep. 28, 2023.

Notice of Reasons for Refusal, JP application No. 2022-550830, dated Feb. 10, 2023.

Request for the Submission of an Opinion, KR application No. 10-2022-7028980, dated Jan. 15, 2025.

* cited by examiner

1000

100

40

20

<u>50</u>

<u>50</u>

60

210
610
613
620
623
630
633

20

605
604
601
602
603
210
240

20

40

BATTERY CELL, BATTERY, AND ELECTRICAL DEVICE

CROSS REFERENCE TO RELATED APPLICATIONS

This application is a continuation of International Patent Application No. PCT/CN2021/114641, filed on Aug. 26, 2021, the disclosure of which is incorporated by reference in its entirety.

TECHNICAL FIELD

Embodiments of this application relate to the field of batteries, and in particular, to a battery cell, a battery, and an electrical device.

BACKGROUND

Energy conservation and emission reduction is key to sustainable development of the automobile industry. Electric vehicles have become an important part of the sustainable development of the automobile industry by virtue of energy saving and environmental friendliness. Battery technology is crucial to development of the electric vehicles.

During research, the inventor of this application finds that, with the aging of an electrode assembly and the increase of charge-and-discharge cycles, problems such as electrolyte shortage may occur in an existing battery during the cycles.

SUMMARY

Embodiments of this application provide a battery cell, a battery, and an electrical device to make it more convenient to refill the battery cell with substances.

According to a first aspect, an embodiment of this application provides a battery cell, including: a housing and an electrode assembly.

The electrode assembly is accommodated in the housing. A film structure is arranged at a position located on an inner wall of the housing and opposite to the electrode assembly. The film structure combines with the inner wall of the housing to form a capsule structure. An accommodation cavity is formed inside the capsule structure.

This embodiment of this application greatly reduces the space occupied by the capsule structure, utilizes any tiny gaps between the electrode assembly and the housing to a greater extent, and improves a filling rate of the battery cell. In addition, after the capsule structure is ruptured, the film structure of the capsule structure is still fixed to the housing without falling off into the interior of the battery cell, or leaving any residues, or causing any impact to the battery cell.

In some embodiments, the capsule structure is arranged at a position located on the inner wall of the housing and opposite to a sidewall of the electrode assembly.

In this embodiment of this application, the capsule structure can be arranged wherever the placement of a tank is inconvenient, for example, on a lateral face, an upper part, a lower part, or a corner of a space between the electrode assembly and the housing, thereby greatly improving efficiency of arranging tanks in the battery cell.

In some embodiments, an explosion-proof valve is arranged on the housing. The capsule structure is arranged at a position located on the inner wall of the housing and opposite to the explosion-proof valve.

In this embodiment of this application, the capsule structure is arranged at a position located on the inner wall of the housing and opposite to the explosion-proof valve. The arrangement of the capsule structure opposite to the explosion-proof valve facilitates release of the filling substance stored in the capsule structure.

In some embodiments, the film structure combines with two or three adjacent inner sidewalls of the housing to form the capsule structure.

Such an arrangement fully utilizes tiny spaces between the housing and the electrode assembly, so that the electrode assembly can be refilled with desired substances by maximally utilizing the tiny spaces.

In some embodiments, a fragile structure is arranged on a surface of the capsule structure.

In this embodiment of this application, with the fragile structure arranged on the capsule structure, the filling substance stored in the capsule structure can be released quickly, and the electrode assembly can be refilled with desired substances conveniently in time.

In some embodiments, a plurality of capsule structures are formed on the housing, and the fragile structure of each of the capsule structures possesses a different packaging strength.

With the capsule structures in this embodiment of this application, different filling substances stored in different capsule structures can be released stepwise in response to different external pressures. Therefore, the electrode assembly at different stages can be refilled with different dosages of electrolyte or different types of desired substances depending on the internal pressure of the battery cell, thereby improving pertinency of refiling the electrode assembly with the desired substances.

In some embodiments, the fragile structure is arranged opposite to the electrode assembly.

In this embodiment of this application, with the fragile structure arranged opposite to a sidewall of the electrode assembly, the filling substance can contact the sidewall of the electrode assembly first, thereby improving the effect of infiltration.

In some embodiments, a plurality of independent accommodation cavities are arranged in the capsule structure, a fragile structure is arranged on the film structure corresponding to each accommodation cavity, and the fragile structure of each accommodation cavity possesses a different packaging strength.

This embodiment of this application implements the function of storing different types of filling substances by using a single capsule structure. The different filling substances stored in the accommodation cavities in the capsule structure can be released stepwise in response to different external pressures. Therefore, the electrode assembly at different stages can be refilled with different dosages of electrolyte or different types of desired substances depending on the internal pressure of the battery cell, thereby improving pertinency of refilling the electrode assembly with the desired substances.

In some embodiments, one or more sub-capsule structures are arranged inside the capsule structure. The capsule structure and the sub-capsule structures are nested with each other to form independent accommodation cavities. Packaging strengths of the fragile structures of the accommodation cavities increase progressively from outward to inward.

This embodiment of this application implements the function of storing different types of filling substances by using a single tank. The different filling substances stored in the accommodation cavities in the tank can be released stepwise in response to different external pressures, thereby improving pertinency of refilling the electrode assembly with the desired substances.

In some embodiments, a membrane is arranged in the capsule structure. The membrane is configured to partition an interior of the capsule structure into a plurality of independent accommodation cavities.

This embodiment of this application implements the function of storing different types of filling substances by using a single tank. The different filling substances stored in the accommodation cavities in the tank can be released stepwise in response to different external pressures, thereby improving pertinency of refilling the electrode assembly with the desired substances.

In some embodiments, each fragile structure possesses a different packaging thickness.

In this embodiment of this application, the corresponding fragile structure of each accommodation cavity possesses a different packaging strength. In this way, among the corresponding fragile structures of the accommodation cavities under the action of the gas pressure in the battery cell, the filling substance in the accommodation cavity corresponding to the fragile structure with the lowest packaging strength is released first. The filling substances in the accommodation cavities corresponding to the fragile structures with relatively high packaging strengths are released stepwise when the gas pressure in the battery cell increases gradually.

In some embodiments, the fragile structure is nicked to different depths.

In this embodiment of this application, the fragile region is formed by nicking a given part of the outer wall of the capsule structure. The depth of the nick represents the packaging strength of the fragile region. A great depth represents a lower packaging strength, and a small depth represents a higher packaging strength.

In some embodiments, the packaging strengths of the fragile structures change stepwise.

In this embodiment of this application, in view of the characteristics of the internal pressure of the electrode assembly and the substances required by the electrode assembly in different pressure stages, the packaging strengths of the corresponding fragile structures of the accommodation cavities are set to change stepwise to gradually release the substances required by the electrode assembly.

In some embodiments, each accommodation cavity stores a different substance.

In this embodiment of this application, different substances are stored in different accommodation cavities and available for refilling the electrode assembly, thereby achieving the purposes such as improving the lifespan of the electrode assembly and the safety of the electrode assembly.

In some embodiments, the accommodation cavities store a flame retardant, a gas absorbent, a lithium supplementing agent, and an electrolytic solution respectively in descending order of the packaging strength of the fragile structure.

In this embodiment of this application, the electrode assembly is provided with various desired substances more pertinently, thereby achieving the purposes such as improving the lifespan of the electrode assembly and the safety of the electrode assembly.

According to a second aspect, an embodiment of this application discloses a battery. The battery includes the battery cell according to the foregoing embodiment.

According to a third aspect, an embodiment of this application discloses an electrical device. The electrical device includes the battery according to the foregoing embodiment. The battery is configured to provide electrical energy.

BRIEF DESCRIPTION OF DRAWINGS

The drawings described herein are intended to enable a further understanding of this application, and constitute a part of this application. The exemplary embodiments of this application and the description thereof are intended to explain this application but not to constitute any undue limitation on this application. In the drawings.

Figure 1:
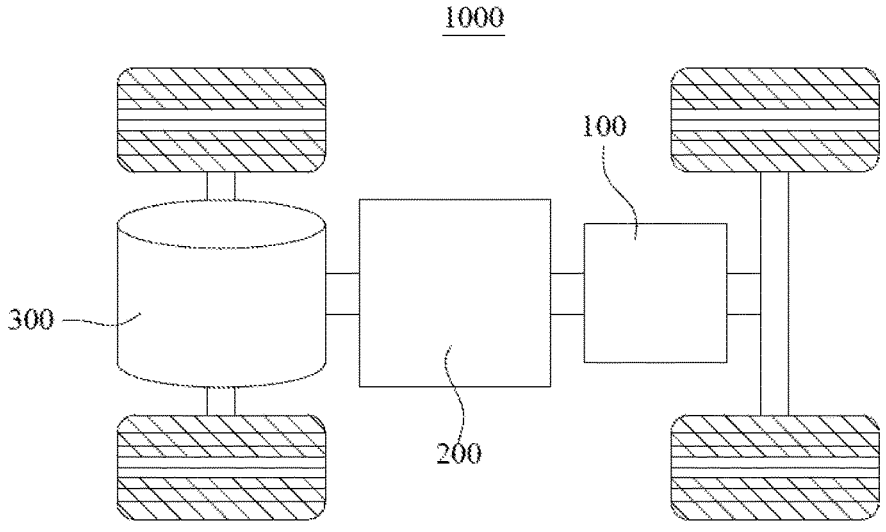
FIG. 1 is a schematic structural diagram of a vehicle according to an embodiment of this application.

REFERENCE NUMERALS vehicle 1000, battery 100, box 10, upper box 11, lower box 12, controller 200, motor 300;

battery cell 20, housing 210, electrode 220, explosion-proof valve 230, electrode assembly 240;

capsule structure 30, accommodation cavity 300, film structure 301, first single-wall tank 310, second single-wall tank 320, third single-wall tank 330, and fourth single-wall tank 340;

discrete tank 40, accommodation cavity 400, tank wall 401, fragile structure 402, first discrete tank 410, first tank wall 411, first fragile structure 412, nick 413, second discrete tank 420, second tank wall 421, second fragile structure 422, third discrete tank 430, fourth discrete tank 440, fifth discrete tank 450;

parent-child tank 50, first parent-child tank 501, second parent-child tank 502, third parent-child tank 503, fourth parent-child tank 504, fifth discrete tank 505, first accommodation cavity 510, first tank wall 511, first fragile structure 512, first filling substance 513, second accommodation cavity 520, second tank wall 521, second fragile structure 522, second filling substance 523, third accommodation cavity 530, third tank wall 531, third fragile structure 532, third filling substance 533;

twin tank 60, first twin tank 601, second twin tank 602, third twin tank 603, fourth twin tank 604, fifth discrete tank 605, first accommodation cavity 610, first tank wall 611, first fragile structure 612, first filling substance 613, first membrane 614, second accommodation cavity 620, second tank wall 621, second fragile structure 622, second filling substance 623, second membrane 624, third accommodation cavity 630, third tank wall 631, third fragile structure 632, third filling substance 633.

DETAILED DESCRIPTION OF EMBODIMENTS

To make the objectives, technical solutions, and advantages of the embodiments of this application clearer, the following gives a clear description of the technical solutions in the embodiments of this application with reference to the drawings in the embodiments of this application. Evidently, the described embodiments are merely a part of but not all of the embodiments of this application. All other embodiments derived by a person of ordinary skill in the art based on the embodiments of this application without making any creative efforts fall within the protection scope of this application.

Unless otherwise defined, all technical and scientific terms used herein have the same meanings as usually understood by a person skilled in the technical field of this application. The terms used in the specification of this application are merely intended for describing specific embodiments but are not intended to limit this application. The terms "include" and "contain" and any variations thereof used in the specification, claims, and brief description of drawings of this application are intended as non-exclusive inclusion. The terms such as "first" and "second" used in the specification, claims, and brief description of drawings herein are intended to distinguish between different items, but are not intended to describe a specific sequence or order of precedence.

Reference to "embodiment" in this application means that a specific feature, structure or characteristic described with reference to the embodiment may be included in at least one embodiment of this application. Reference to this term in different places in the specification does not necessarily represent the same embodiment, nor does it represent an independent or alternative embodiment in a mutually exclusive relationship with other embodiments. A person skilled in the art explicitly and implicitly understands that the embodiments described in this application may be combined with other embodiments.

In the description of this application, unless otherwise expressly specified and defined, the terms "mount", "concatenate", "connect", and "attach" are understood in a broad sense. For example, a "connection" may be a fixed connection, a detachable connection, or an integrated connection; or may be a direct connection or an indirect connection implemented through an intermediary; or may be internal communication between two components. A person of ordinary skill in the art understands the specific meanings of the terms in this application according to the context.

The term "and/or" in this application indicates merely a relation for describing the related items, and represents three possible relationships. For example, "A and/or B" may represent the following three circumstances: A alone, both A and B, and B alone. In addition, the character "/" herein generally indicates an "or" relationship between the item preceding the character and the item following the character.

"A plurality of" referred to in this application means two or more (including two). Similarly, "a plurality of groups" means two or more groups (including two groups), and "a plurality of pieces" means two or more pieces (including two pieces).

In this application, a battery cell may include a lithium-ion secondary battery, a lithium-ion primary battery, a lithium-sulfur battery, a sodium-lithium-ion battery, a sodium-ion battery, a magnesium-ion battery, or the like. The embodiments of this application do not limit the type of the battery cell. The battery cell may be in a cylindrical shape, a flat shape, a cuboidal shape, or other shapes. The embodiments of this application do not limit the shape of the battery cell. Depending on the form of packaging, the battery cell is typically classed into three types: cylindrical battery cell, prismatic battery cell, and pouch-type battery cell. The embodiments of this application do not limit the form of the battery cell.

Currently, with the progress of technology, power batteries are applied more widely. Power batteries are not only used in energy storage power systems such as hydro, thermal, wind, and solar power stations, but also widely used in electric means of transport such as electric bicycles, electric motorcycles, and electric vehicles, and used in many other fields such as military equipment and aerospace. The market demand for power batteries keeps expanding with the widening of the fields to which the power batteries are applicable.

The inventor of this application has noticed that ions are intercalated into or deintercalated from a positive active material and a negative active material during charge-and-discharge cycles of a battery, resulting in expansion inside an electrode assembly. An electrolytic solution inside the electrode assembly decreases gradually, resulting in electrolyte shortage inside the electrode assembly and lack of active lithium components. With the aging of the electrode assembly and excessive amount of gassing inside the electrode assembly, the problem of metal dissolution gradually occurs. In severer cases, thermal runaway may occur, and the battery is prone to fire or explosion. The resulting safety problems are non-negligible.

In view of this, an electrolyte refilling mechanism is usually arranged in a battery cell. The electrolyte refilling mechanism contains an electrolytic solution. When expansion occurs inside the electrode assembly and an internal pressure increases, the electrolyte refilling mechanism ruptures, and releases and provides pre-stored electrolytic solution to the electrode assembly, so as to make up for the electrolytic solution that is lacking due to the increased charge-and-discharge cycles or aging of the electrode assembly.

However, during research, the inventor of this application finds that an existing electrolyte refilling mechanism is usually an electrolyte refilling capsule. The electrolyte refilling capsule is placed in a battery cell. When an internal pressure of the battery cell increases, the electrolyte refilling capsule is crushed to release the filling substance stored in the capsule. However, in the existing electrolyte refilling method, the electrolyte refilling capsule needs to occupy a large space. In addition, after the capsule is ruptured, the substance that constitutes an outer wall of the capsule is not dissolved in an electrolytic solution of the electrode assembly, and therefore, is prone to affect the electrode assembly.

In addition, the amount of electrolytic solution that is lacking varies depending on how long the electrode assembly has been used. For example, after the electrode assembly has just been used for a short duration, just a small amount of electrolytic solution is lacking. With the increase of the duration of being used, the amount of electrolytic solution that is lacking increases gradually. The electrode assembly needs to be refilled with different dosages of electrolytic solution at different stages. In addition, the electrolyte shortage inside the electrode assembly leads to different hazards in different stages of the electrode assembly. Electrolyte refilling alone is unable to solve the problems arising in the long-term use of the electrode assembly. Currently, no solutions are available to pertinently refilling the battery cell with the substance that is lacking, and to resolving hazards at different stages. Refined solutions are lacking.

In view of the foregoing factors, in order to solve inconvenience of refilling the electrode assembly with the substance that is lacking during use of the electrode assembly, the inventor of this application has carried out in-depth research and designed a battery cell and an electrical device. A film structure is arranged at a position located on an inner wall of a housing of the battery cell and opposite to an electrode assembly. The film structure combines with the inner wall of the housing to form a capsule structure. An accommodation cavity is formed inside the capsule structure. The accommodation cavity may store a filling substance required by the electrode assembly. The structure of the supplementary filling substance is fitted to the housing of the battery cell to achieve a compact structure and space-efficiency, thereby providing more space for the electrode assembly and improving the filling rate of the battery cell. With the capsule structure fitted to the housing, after the capsule structure is ruptured, the film structure of the capsule structure is still fixed to the housing without falling off into the interior of the battery cell, or leaving any residues, or causing any impact to the battery cell.

The battery cell disclosed in this embodiment of this application is applicable to, but without being limited to, electrical devices such as a vehicle, watercraft, or aircraft. A power supply system of the electrical device may include the tank, the battery cell, and the like disclosed in this application to help alleviate the problems such as lack of substances and degradation of safety of the electrode assembly in use, and improve performance stability and longevity of the battery.

An embodiment of this application provides an electrical device powered by a battery. The electrical device may be, but without being limited to, a mobile phone, a tablet, a notebook computer, an electric toy, an electric tool, an electric power cart, an electric vehicle, a ship, a spacecraft, and the like. The electric toy may include stationary or mobile electric toys, such as a game console, an electric car toy, an electric ship toy, an electric airplane toy, and the like. The spacecraft may include an airplane, a rocket, a space shuttle, a spaceship, and the like.

For ease of description in the following embodiments, a vehicle 1000 is used as an example of the electrical device according to an embodiment of this application.

Referring to FIG. 1, FIG. 1 is a schematic structural diagram of a vehicle 1000 according to an embodiment of this application. The vehicle 1000 may be an oil-fueled vehicle, a natural gas vehicle, or a new energy vehicle. The new energy vehicle may be a battery electric vehicle, a hybrid electric vehicle, a range-extended electric vehicle, or the like. A battery 100 is disposed inside the vehicle 1000. The battery 100 may be disposed at the bottom, front, or rear of the vehicle 1000. The battery 100 may be configured to supply power to the vehicle 1000. For example, the battery 100 may serve as an operating power supply of the vehicle 1000. The vehicle 1000 may further include a controller 200 and a motor 300. The controller 200 is configured to control the battery 100 to supply power to the motor 300, for example, to start or navigate the vehicle 1000, or meet the operating power requirements of the vehicle in operation.

In some embodiments of this application, the battery 100 serves not only as an operating power supply of the vehicle 1000, but may also serve as a drive power supply of the vehicle 1000 to provide driving power for the vehicle 1000 in place of or partially in place of oil or natural gas.

Figure 2:
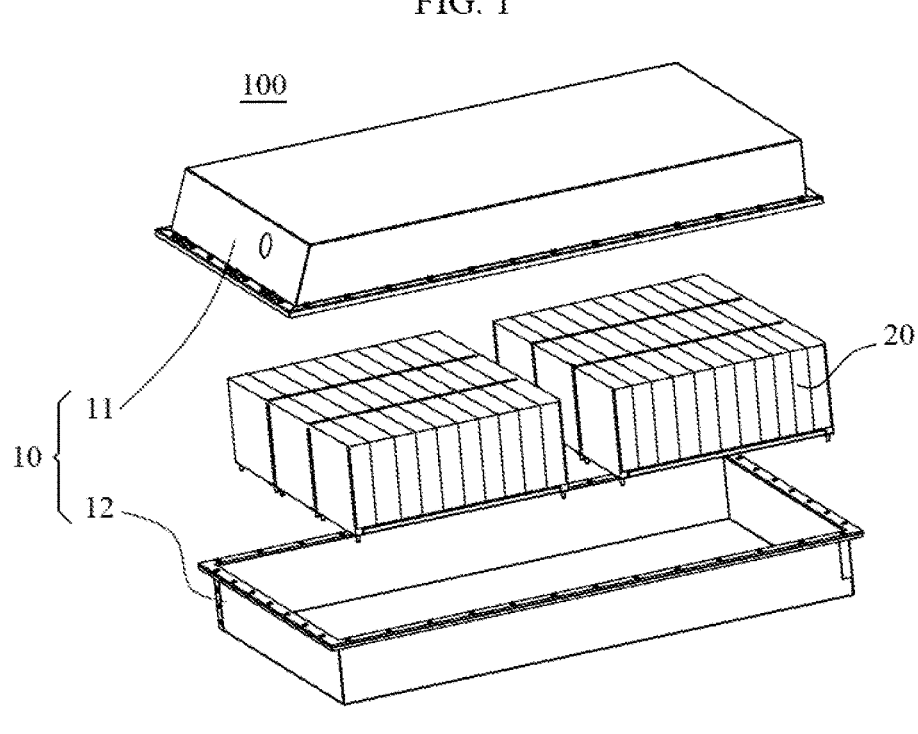
FIG. 2 is a schematic structural exploded view of a battery according to an embodiment of this application.

Referring to FIG. 2, FIG. 2 is an exploded view of a battery 100 according to an embodiment of this application. The battery 100 includes a box 10 and a battery cell 20. The battery cell 20 is accommodated in the box 10. The box 10 is configured to provide an accommodation space for the battery cell 20. The box 10 may be variously structured. In some embodiments, the box 10 may include an upper box 11 and a lower box 12. The upper box 11 and the lower box 12 fit and cover each other. The upper box 11 and the lower box 12 together define an accommodation space configured to accommodate the battery cell 20. The lower box 12 may be a hollow structure opened at one end. The upper box 11 may be a plate-like structure. The upper box 11 fits an opening end of the lower box 12 so that the upper box 11 and the lower box 12 together define the accommodation space. Alternatively, both the upper box 11 and the lower box 12 may be hollow structures opened at one end. The opening end of the upper box 11 fits the opening end of the lower box 12. Definitely, the box 10 formed by the upper box 11 and the lower box 12 may be in various shapes, such as a cylinder or a cuboid.

The battery 100 referred to in this embodiment of this application means a stand-alone physical module that includes one or more battery cells to provide a higher voltage and a higher capacity. For example, the battery 100 referred to in this application may include a battery module, a battery pack, and the like. There may be a plurality of battery cells 20, and the plurality of battery cells 20 may be connected in series, parallel, or series-and-parallel pattern. The series-and-parallel pattern means a combination of series connection and parallel connection of the plurality of battery cells 20. The plurality of battery cells 20 may be directly connected in series, parallel, or series-and-parallel pattern, and then the whole of the plurality of battery cells 20 may be accommodated in the box 10. Alternatively, the plurality of battery cells 20 may be connected in series, parallel, or series-and-parallel pattern to form a battery 100 in the form of battery modules first. A plurality of battery modules are then connected in series, parallel, or series-and-parallel pattern to form a whole for being accommodated in the box 10. The battery 100 may further include other structures. For example, the battery 100 may further include a busbar component. The busbar component is configured to implement electrical connection between the plurality of battery cells 20.

Each battery cell 20 may be, but is not limited to, a lithium-ion secondary battery, a lithium-ion primary battery, a lithium-sulfur battery, a sodium-lithium-ion battery, or a magnesium-ion battery. The battery cell 20 may be in a cylindrical shape, a flat shape, a cuboidal shape, or other shapes.

Figure 3:
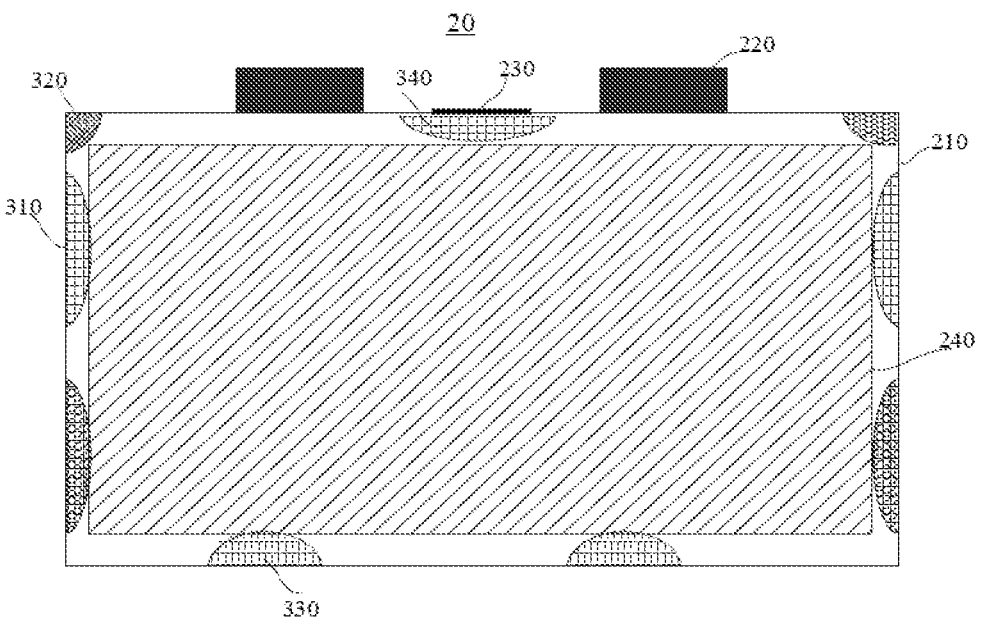
FIG. 3 is a schematic structural diagram of a battery cell according to an embodiment of this application.

For further understanding of the battery cell according to embodiments of this application, refer to a battery cell 20 shown in FIG. 3. The battery cell 20 includes a housing 210, electrodes 220, and an electrode assembly 240. The electrode assembly 240 is located in the housing 210, and is connected to the electrodes 220 and configured to output electrical energy outward.

The housing 210 is a component configured to form an internal environment of the battery cell. The formed internal environment may be used to accommodate the electrode assembly, an electrolytic solution, and other components. The electrodes 220 are led out of the housing 210. The electrodes includes a positive electrode and a negative electrode. The positive electrode and the negative electrode are connected to a positive tab and a negative tab of the electrode assembly respectively by an adapter. The housing may be shaped and sized variously, for example, cuboidal, cylindrical, or hexagonal prismatic. Specifically, the shape of the housing may be determined depending on the specific shape and size of an electrode assembly. The housing may be made of a variety of materials such as copper, iron, aluminum, stainless steel, aluminum alloy, or plastic, without being particularly limited herein.

In addition, when the battery cell is in use, gas is generated inside the electrode assembly over time. The gas pressure inside the housing increases gradually. To ensure safety of the battery cell, an explosion-proof valve 230 is arranged between electrodes on the housing. When the gas pressure in the battery cell reaches a given value, the pressure can be released through the explosion-proof valve to avoid safety problems such as explosion of the battery cell.

The electrode assembly 240 is a component that reacts electrochemically in the battery cell 20. The housing may contain one or more electrode assemblies. The electrode assembly is primarily formed by winding or stacking a positive electrode plate and a negative electrode plate, and a separator is generally arranged between the positive electrode plate and the negative electrode plate. The parts, coated with an active material, of the positive electrode plate and the negative electrode plate, constitute a body portion of the electrode assembly. The parts, coated with no active material, of the positive electrode plate and the negative electrode plate, constitutes a positive tab and a negative tab, respectively. The positive tab and the negative tab may be located at one end of the body portion together or at two ends of the body portion separately. In a charge-and-discharge process of the battery, the positive active material and the negative active material react with an electrolytic solution. The tabs are connected to electrode terminals to form a current circuit. The positive tab is connected to the positive electrode on the housing by an adapter, and the negative tab is connected to the negative electrode on the housing by an adapter.

To solve the foregoing problems in the prior art, as shown in FIG. 3, a battery cell according to an embodiment of this application includes a housing 210 and an electrode assembly 240. The electrode assembly 240 is accommodated in the housing 210. A film structure is arranged at a position located on an inner wall of the housing 210 and opposite to the electrode assembly 240. The film structure combines with the inner wall of the housing 210 to form a capsule structure. An accommodation cavity is formed inside the capsule structure.

Figure 4:
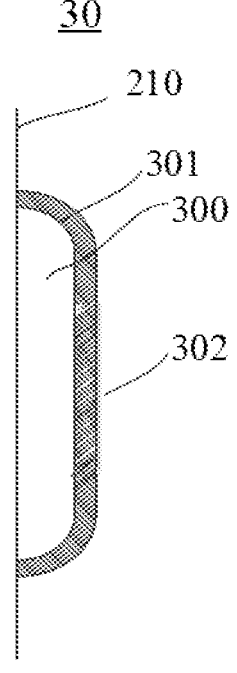
FIG. 4 is a schematic structural diagram of a capsule structure according to an embodiment of this application.

In a space between the battery cell 240 and the housing 210 inside the battery cell, a film structure 301 is fitted to the inner wall of the housing 210 to form a capsule structure 30. Specifically, as shown in FIG. 4, the capsule structure 30 is formed by the film structure 301 and an inner wall of the housing 210, so as to form an accommodation cavity 300. To be specific, the film structure is used as a tank wall, and the tank wall is fitted to the inner wall of the housing to form the capsule structure. The accommodation cavity is arranged inside the capsule structure, and the accommodation cavity may store a filling substance.

The film structure is usually made of a flexible material. The accommodation cavity formed by the film structure is capable of storing liquid, inert gas, or other forms of substances. Understandably, the capsule structure is not necessarily capsule-shaped, but may be made into any shape that meets requirements of the application environment, for example, may be square, round, oval, or irregularly shaped. The flexible material may be formed by stamping an aluminum sheet and then sputtering an inert material onto the surface of the stamped aluminum sheet, where the inert material is a high-molecular polymer such as PP, PE, PET, or PVC. Alternatively, the tank may be made of other materials of specified flexibility and hardness.

To form the structure, the flexible material is first affixed onto the inner wall of the housing by firm gluing or laser welding or other means, and then the accommodation cavity formed by the flexible material is filled with a substance required by the battery cell, and next, by gluing or laser welding, the accommodation cavity is closed to form a capsule structure attached to the inner wall of the housing, so that the capsule structure and the housing are integrated.

In this embodiment of this application, the capsule structure is fitted to the inner wall of the housing so that the capsule structure and the housing are fitted together, thereby greatly reducing the space occupied by the capsule structure, utilizing any tiny gaps between the electrode assembly and the housing to a greater extent, and improving a filling rate of the battery cell. In addition, because the capsule structure and the housing are fitted together, during formation of the battery cell, the capsule structure can be arranged on the housing beforehand, thereby reducing the difficulty of operation during formation of the battery cell, avoiding the step of re-arranging the capsule structure, and simplifying installation. In addition, an existing electrolyte refilling mechanism is usually an electrolyte refilling capsule. The electrolyte refilling capsule is placed in a battery cell. When an internal pressure of the battery cell increases, the electrolyte refilling capsule is crushed to release the filling substance stored in the capsule. However, in such an existing electrolyte refilling method, after the capsule is ruptured, the substance that constitutes an outer wall of the capsule is not dissolved in an electrolytic solution of the electrode assembly, and therefore, is prone to affect the electrode assembly. In contrast, in this embodiment of this application, with the capsule structure fitted to the housing, after the capsule structure is ruptured, the film structure of the capsule structure is still fixed to the housing without falling off into the interior of the battery cell or leaving any residues, thereby avoiding causing any impact to the battery cell.

In this embodiment of this application, the capsule structure is arranged at a position located on the inner wall of the housing and opposite to a sidewall of the electrode assembly. When the battery cell is placed vertically, an interspace is usually left between the sidewall of the electrode assembly and the inner wall of the housing. The interspace causes the electrode assembly to shake, and in turn, leads to lithium plating of the electrode assembly. In this embodiment of this application, as shown in FIG. 3, a capsule structure is arranged at a position located on the inner wall of the housing and opposite to the sidewall of the electrode assembly. The sidewall of the electrode assembly includes a sidewall in a width direction of the electrode assembly, a sidewall in a thickness direction of the electrode assembly, and a sidewall in a height direction of the electrode assembly. In FIG. 3, a capsule structure is fitted to the inner wall of the housing 210. One edge of the capsule structure may be fitted to the inner wall of the housing to form a single-wall tank. As shown in FIG. 3, a first single-wall tank 310, a second single-wall tank 320, a third single-wall tank 330, and a fourth single-wall tank 340 are fitted on the inner wall of the housing. The first single-wall tank 310 is fitted to the inner wall of the housing in the width direction of the electrode assembly. The second single-wall tank 320 is arranged at a corner of an inner wall of the housing, where the inner wall is defined by the height direction and the width direction of the electrode assembly. The film structure combines with two inner sidewalls of the housing to form a capsule structure. The third single-wall tank 330 is fitted to an inner wall of the housing at the bottom, and corresponds to the bottom of the electrode assembly. Evidently, in this embodiment of this application, the film structure is fitted to an inner sidewall of the housing, and the inner wall combines with the film structure to form a capsule structure, thereby saving the internal space of the battery cell. The capsule structure can be arranged wherever the placement of a tank is inconvenient, for example, on a lateral face, an upper part, a lower part, or a corner of a space between the electrode assembly and the housing, thereby greatly improving efficiency of arranging tanks in the battery cell.

In this embodiment of this application, an explosion-proof valve is arranged on top of the housing. The capsule structure is arranged at a position located on the inner wall of the housing and opposite to the explosion-proof valve. As shown in FIG. 3, an explosion-proof valve 230 is arranged between electrodes 220 on the housing of the battery cell. The explosion-proof valve 230 is a pressure relief hole designed to prevent an excessive gas pressure inside the battery cell. When the gas pressure in the battery cell is higher than a given threshold, the gas in the battery cell is released through the explosion-proof valve, thereby relieving the gas pressure in the battery cell. As shown in FIG. 3, the fourth single-wall tank 340 is arranged at a position located on an upper part of the housing and corresponding to the explosion-proof valve. In this embodiment of this application, the capsule structure is arranged at a position located on the inner wall of the housing and opposite to the explosion-proof valve. The arrangement of the capsule structure opposite to the explosion-proof valve facilitates release of the filling substance stored in the capsule structure.

In this embodiment of this application, the film structure combines with two or three adjacent inner sidewalls of the housing to form the capsule structure. The internal space of the battery cell is limited, especially between the electrode assembly and the housing. In order to fully utilize the space inside the battery cell, this embodiment of this application arranges a filling substance accommodation structure at the corner of the housing by arranging the capsule structure. As shown in FIG. 3, the second single-wall tank 320 is arranged at a corner on an upper part of the housing. The corner includes a corner defined by two adjacent inner sidewalls of the housing and a corner defined by three adjacent inner sidewalls of the housing. When the capsule structure is arranged at the corner of two adjacent inner sidewalls of the housing, the film structure needs to fit closely with both adjacent inner sidewalls to form an accommodation cavity. When the capsule structure is arranged at the corner of three adjacent inner sidewalls of the housing, the film structure needs to fit closely with all three adjacent inner sidewalls to form an accommodation cavity. Such an arrangement fully utilizes tiny spaces between the housing and the electrode assembly, so that the electrode assembly can be refilled with desired substances by maximally utilizing the tiny spaces.

Figures 5, 6:
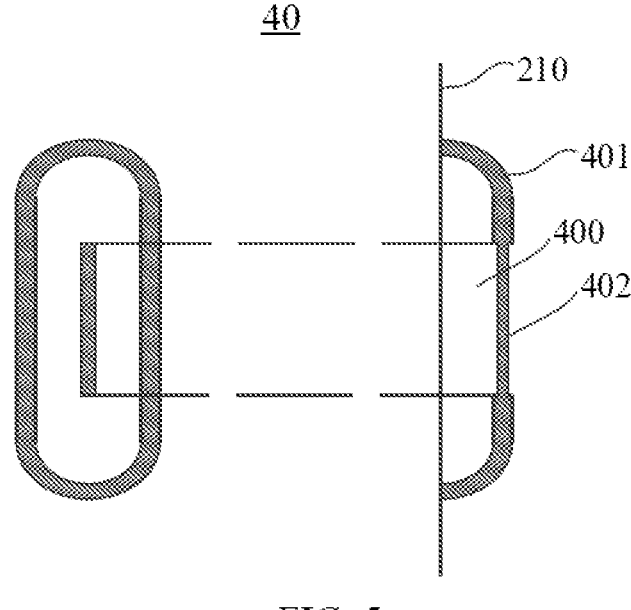
FIG. 5 is a schematic structural diagram of a discrete tank according to an embodiment of this application.
FIG. 6 is a schematic structural diagram of another battery cell according to an embodiment of this application.

In this embodiment of this application, in order to refill the electrode assembly with desired substances more conveniently, a fragile structure is arranged on a surface of the capsule structure. Specifically, as shown in FIG. 5, the capsule structure is a discrete tank 40. The discrete tank 40 is formed by being enclosed with a tank wall 401, a fragile structure 402, and an inner wall of the housing 210, so as to form an accommodation cavity 400. The packaging strength of the fragile structure 402 may be formed by making a fragile region in a given part of the flexible material in a way such as reducing the thickness of the given part by laser etching, acid etching of aluminum, or die-cut mold scratching of aluminum. The proportion of the fragile region in the area of the entire outer wall of the tank is approximately 10% to 50%. The thickness of the fragile region is generally 10 μm to 300 μm. The pressure borne by the fragile region is less than that borne by other non-thinned regions. The thickness may differ between the fragile regions depending on the required packaging strength. The pressure threshold borne by the fragile region is positively correlated with the thickness (for example, the internal pressure threshold is 0.25 MPa when the thickness of the fragile region is 100 μm, and the internal pressure threshold is 0.4 MPa when the thickness is 200 μm). In this embodiment of this application, with the fragile structure arranged on the discrete tank 40, the filling substance stored in the discrete tank 40 can be released quickly, and the electrode assembly can be refilled with desired substances conveniently in time.

Further, during research, the inventor of this application finds that the amount of the electrolytic solution that is lacking varies depending on how long the electrode assembly has been used. For example, after the electrode assembly has just been used for a short duration, just a small amount of electrolytic solution is lacking. With the increase of the duration of being used, the amount of electrolytic solution that is lacking increases gradually. Therefore, the electrode assembly at different stages needs to be refilled with different dosages of electrolytic solution. In addition, the electrolyte shortage inside the electrode assembly leads to different hazards in different stages of the electrode assembly. Electrolyte refilling alone is unable to solve the problems arising in the long-term use of the electrode assembly.

To refill the battery cell with desired substances more meticulously, in some embodiments of this application, a plurality of capsule structures are formed on the inner wall of the housing 210. The fragile structure of each of the capsule structures possesses a different packaging strength.

As shown in FIG. 6, in the battery cell, a plurality of discrete tanks are arranged at a plurality of positions on the inner wall of the housing respectively. The packaging strength differs between the fragile structures of the discrete tanks to form a first discrete tank 410, a second discrete tank 420, a third discrete tank 430, a fourth discrete tank 440, and a fifth discrete tank 450. The plurality of discrete tanks are accommodated in the housing, and are arranged corresponding to sidewalls of the electrode assembly respectively. The first tank wall 411 and the first fragile structure 412 combine with an inner sidewall of the housing 210 in the width or thickness direction to form the first discrete tank 410. Similarly, the second tank wall 421 and the second fragile structure 422 combine with an inner sidewall of the housing 210 in the width or thickness direction to form the second discrete tank 420. The first fragile structure differs from the second fragile structure in packaging strength. Similarly, the inner wall of the housing 210 at the bottom combines with the film structure to form a third discrete tank 430. The third discrete tank 430 is located at the bottom of the electrode assembly. The inner sidewall located on top of the housing and opposite to the explosion-proof valve combine with the film structure to form a fourth discrete tank 440. A fifth discrete tank 450 is arranged at a corner of the housing. A fragile structure is arranged on all the foregoing discrete tank structures. Each fragile structure possesses a different packaging strength. The corresponding fragile structure of each capsule structure is configured to possess a different packaging strength. In this way, among the corresponding fragile structures of the capsule structures under the action of the pressure in the battery cell, the filling substance in the accommodation cavity corresponding to the fragile structure with the lowest packaging strength is released first. The filling substances in the accommodation cavities corresponding to the fragile structures with relatively high packaging strengths are released stepwise when the pressure in the battery cell increases gradually.

In this embodiment of this application, a plurality of capsule structures are arranged on the housing, and the fragile structure on each capsule structure possesses a different packaging strength. Different filling substances stored in different capsule structures can be released stepwise in response to different external pressures. Therefore, the electrode assembly at different stages can be refilled with different dosages of electrolyte or different types of desired substances depending on the internal pressure of the battery cell, thereby improving pertinency of refilling the electrode assembly with the desired substances.

In some embodiments, in order to improve the effect of infiltration, the fragile structure of the capsule structure is arranged corresponding to the sidewall of the electrode assembly, that is, the fragile structure fits closely with the outer wall of the electrode assembly. The filling substance stored in the accommodation cavity inside the capsule structure overflows from the fragile structure. With the fragile structure arranged corresponding to the sidewall of the electrode assembly, the filling substance can contact the sidewall of the electrode assembly first, thereby improving the effect of infiltration. For the tank arranged at one end of the electrode assembly in the height direction, the fragile structure closely fits with a tab part of the electrode assembly downward. When the fragile structure is ruptured, the overflowing filling substance infiltrates the interior of the electrode assembly more easily.

In some embodiments, a plurality of independent accommodation cavities are arranged in the capsule structure, a fragile structure is arranged on the film structure corresponding to each accommodation cavity, and the fragile structure of each accommodation cavity possesses a different packaging strength.

Figure 7A:
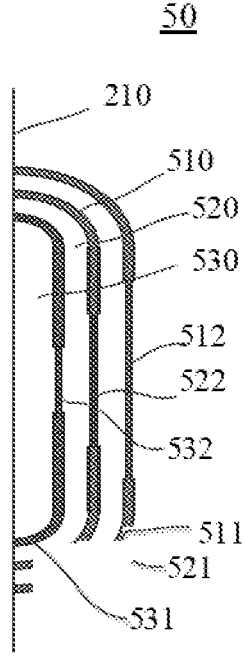
FIG. 7a is a schematic structural diagram of a parent-child tank according to an embodiment of this application.
Figure 9A:
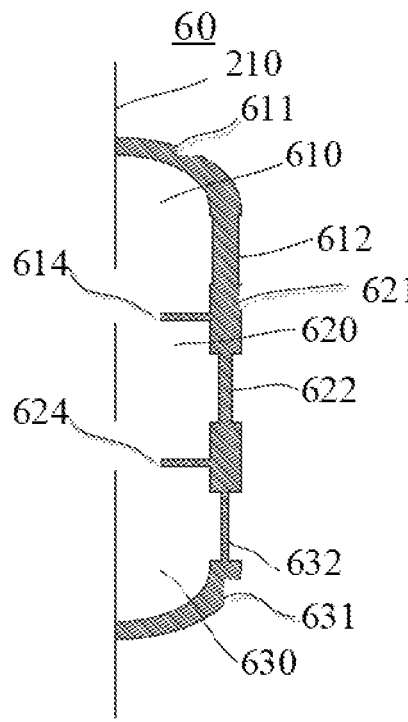
FIG. 9a is a schematic structural diagram of a twin tank according to an embodiment of this application.

A plurality of independent accommodation cavities may be arranged in the capsule structure in the way shown in FIG. 7a or FIG. 9a. Identical or different film materials fit closely with the inner wall of the housing to partition the interior space of the capsule structure into a plurality of independent closed spaces. The closed spaces form independent accommodation cavities. The accommodation cavities are configured to hold liquid or inert gas. With the independent accommodation cavities arranged, different liquids or inert gases can be separated from each other, so as to release different substances pertinently.

Each accommodation cavity is formed by being surrounded by the flexible material. A fragile structure is arranged on an outer wall of each accommodation cavity enclosed with the corresponding flexible material. That is, each accommodation cavity formed in the capsule structure corresponds to a fragile structure separately. In this way, the liquid or inert gas stored in each accommodation cavity can be released through the corresponding fragile structure without affecting the filling substance stored in other accommodation cavities.

To release the filling substances from different accommodation cavities stepwise, this application assigns a different packaging strength to the fragile structure corresponding to each different accommodation cavity. In this way, among the corresponding fragile structures of the accommodation cavities under the action of the internal pressure of the battery cell, the filling substance in the accommodation cavity corresponding to the fragile structure with the lowest packaging strength is released first. The filling substances in the accommodation cavities corresponding to the fragile structures with relatively high packaging strengths are released stepwise when the gas pressure in the battery cell increases gradually. The packaging strength of the fragile structure may be formed by making a fragile region in a given part of the flexible material in a way such as reducing the thickness of the given part by laser etching, acid etching of aluminum, or die-cut mold scratching of aluminum. The proportion of the fragile region in the area of the entire outer wall of the capsule structure is approximately 10% to 50%. The thickness of the fragile region is generally 10 μm to 300 μm. The pressure borne by the fragile region is less than that borne by other non-thinned regions. The thickness may differ between the fragile regions depending on the required packaging strength. The pressure threshold borne by the fragile region is positively correlated with the thickness (for example, the internal pressure threshold is 0.25 Ma when the thickness of the fragile region is 100 μm, and the internal pressure threshold is 0.4 MPa when the thickness is 200 μm). Therefore, each capsule structure can regulate the pressure relief order by using stepwise thicknesses of the fragile regions. Alternatively, the fragile regions may be formed by nicking a given part of the outer wall of the capsule structure. The depth of the nick represents the packaging strength of the fragile region. A great depth represents a lower packaging strength, and a small depth represents a higher packaging strength.

In this embodiment of this application, a plurality of independent accommodation cavities are arranged inside the capsule structure, each accommodation cavity includes a corresponding fragile structure, and each fragile structure possesses a different packaging strength. In this way, this embodiment implements the function of storing different types of filling substances by using a single capsule structure. The different filling substances stored in the accommodation cavities in the capsule structure can be released stepwise in response to different external pressures. Therefore, the electrode assembly at different stages can be refilled with different dosages of electrolytic solution or different types of desired substances depending on the internal pressure of the battery cell, thereby improving pertinency of refilling the electrode assembly with the desired substances.

Figure 7B:
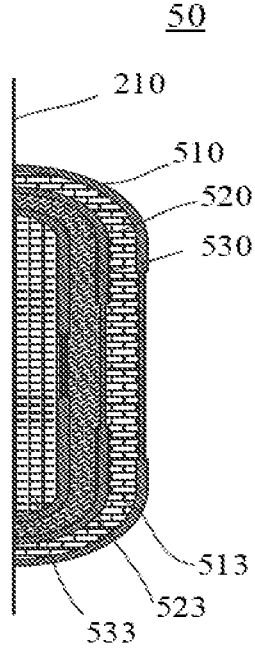
FIG. 7b is a schematic diagram of a parent-child tank filled with different substances according to an embodiment of this application.

To describe the capsule structure in more detail. FIG. 7a shows a parent-child tank structure. One or more sub-tanks are arranged inside the parent-child tank. The tank and the sub-tanks are nested with each other, and combine with the inner wall of the housing to form independent accommodation cavities. Packaging strengths of the corresponding fragile structures of the accommodation cavities increase progressively from outward to inward. FIG. 7b shows effects after the parent-child tank structure is filled with different substances.

As shown in FIG. 7a and FIG. 7b, the parent-child tank structure 50 includes a first accommodation cavity 510, a second accommodation cavity 520, and a third accommodation cavity 530. The first accommodation cavity 510 is formed by being enclosed with a first tank wall 511, a first fragile structure 512, and the inner wall of the housing 210. A sub-tank is arranged inside the first accommodation cavity 510. The sub-tank includes a second accommodation cavity 520. The second accommodation cavity 520 is formed by being enclosed with a second tank wall 521, a second fragile structure 522, and the inner wall of the housing 210. A sub-tank is further arranged inside the second accommodation cavity 520. The sub-tank includes a third accommodation cavity 530. The third accommodation cavity 530 is formed by being enclosed with a third tank wall 531, a third fragile structure 532, and the inner wall of the housing 210. As can be seen from FIG. 7a, the outermost tank forms a parent tank of the parent-child tank structure, and two sub-tanks are formed inside the parent tank. In other words, the tank and the sub-tanks are nested with each other to form independent accommodation cavities. Tanks are further nested inside a tank to form hierarchical nesting.

During formation of the parent-child tank, the innermost sub-tank is formed first by closely fitting the film structure with the inner wall of the housing. After the third filling substance 533 is injected into the third accommodation cavity 530, the third accommodation cavity is sealed by laser welding or other means. At the same time, the third fragile structure 532 is formed on the third tank wall 531. Subsequently, the sub-tank is wrapped in a flexible material. The flexible material fits closely with a part that is of the inner wall and that is other than a joint between the sub-tank and the inner wall of the housing, so as to form a parent tank of the sub-tank. The second accommodation cavity 520 is formed between the sub-tank and the parent tank. After the second filling substance 523 is injected into the second accommodation cavity 520, the second accommodation cavity is sealed by laser welding or other means. At the same time, the second fragile structure 522 is formed on the second tank wall 521. Finally, the second sub-tank is further wrapped in a flexible material to form a parent tank of the second sub-tank. The first accommodation cavity 510 is formed between the sub-tank and the parent tank. After the first filling substance 513 is injected into the first accommodation cavity 510, the first accommodation cavity is sealed by laser welding or other means. At the same time, the first fragile structure 512 is formed on the first tank wall 511. All the sub-tanks formed of the parent-child tank fit closely with the inner wall of the housing to jointly form a capsule structure, thereby greatly reducing the space occupied by the parent-child tank structure. It needs to be noted that FIG. 7a merely shows a structure in which three independent accommodation cavities are arranged inside the parent-child tank. Fewer or more sub-tanks may be arranged as required, details of which are omitted here.

In the parent-child tank structure, the packaging strengths of the fragile structures increase progressively in order from outside to inside of the parent-child tank structure. The first fragile structure 512 is located on the surface of an outermost tank, and possesses the lowest packaging strength, and ruptures first when receiving an internal pressure of the battery cell. The packaging strength of the second fragile structure 522 is higher than the packaging strength of the first fragile structure, and the packaging strength of the third fragile structure 532 is the highest. Under the action of the internal pressure of the battery cell, the fragile structures of the parent-child tank are ruptured in sequence from outside to inside to release the first filling substance 513, the second filling substance 523, and the third filling substance 533 in sequence.

As can be seen from the foregoing embodiment, the parent-child tank structure is nested hierarchically. The film structure combines with the inner wall of the housing to form a plurality of independent accommodation cavities. Each accommodation cavity includes a corresponding fragile structure, and each fragile structure possesses a different packaging strength. In this way, this embodiment implements the function of storing different types of filling substances by using a single tank. The different filling substances stored in the accommodation cavities in the tank can be released stepwise in response to different external pressures, thereby improving pertinency of refilling the electrode assembly with the desired substances.

Figure 8:
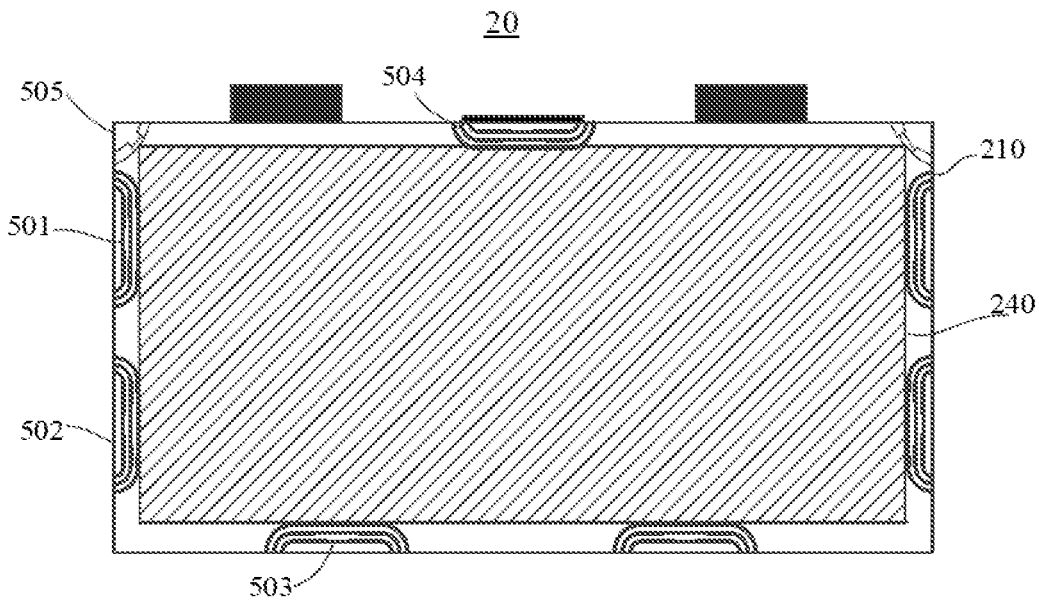
FIG. 8 is a schematic structural diagram of a battery cell that includes a parent-child tank according to an embodiment of this application.

FIG. 8 is a schematic structural diagram of arrangement of the foregoing parent-child tank structure inside a battery cell. The battery cell 20 includes one or more parent-child tanks 50. In FIG. 8, each parent-child tank is formed by combining the film structure with the inner wall of the housing, and is arranged corresponding to a sidewall of the electrode assembly 240. The sidewall of the electrode assembly includes a sidewall of the electrode assembly in a height direction, a sidewall in a width direction, a sidewall of the electrode assembly in a thickness direction, and the like. As shown in FIG. 8, the first parent-child tank 501 and the second parent-child tank 502 are arranged between a sidewall of the electrode assembly in the height direction and the housing. The tank wall of the parent-child tank may be fitted to the inner wall of the housing by gluing or laser welding or other means. The third parent-child tank 503 is arranged corresponding to a sidewall of the electrode assembly in the height direction, and located at the bottom of the housing of the battery cell. The fourth parent-child tank 504 is arranged corresponding to a sidewall at the other end of the electrode assembly in the height direction, and located on the top of the electrode assembly. At the corner of the housing, a parent-child tank may be arranged, or, for convenience, a fifth discrete tank 505 may be arranged instead. When the parent-child tank is arranged on the top of the electrode assembly in the height direction, the substance released by the tank permeates into an electrode core of the electrode assembly more easily due to gravity, thereby improving the effect of electrolyte refilling.

Figures 9B, 10:
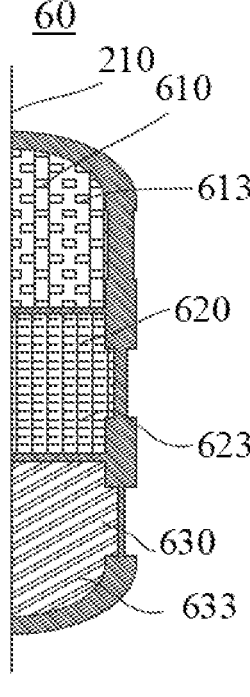
FIG. 9b is a schematic diagram of a twin tank filled with different substances according to an embodiment of this application.
FIG. 10 is a schematic structural diagram of a battery cell that includes a twin tank according to an embodiment of this application.

In another embodiment of this application, a twin tank structure 60 is provided. As shown in FIG. 9a, a membrane is arranged in the twin tank. The membrane, an outer wall of the tank, and the inner wall of the housing jointly partition the interior of the tank into a plurality of independent accommodation cavities. The fragile structure is arranged at a position located on a surface of the tank and corresponding to each accommodation cavity. Each fragile structure possesses a different packaging strength. FIG. 9b is a schematic diagram of the twin tank filled with different substances.

As shown in FIG. 9a, a first accommodation cavity 610, a second accommodation cavity 620, and a third accommodation cavity 630 are arranged in the twin tank 60. The first accommodation cavity 610 is isolated from the second accommodation cavity 620 by a first membrane 614. The second accommodation cavity 620 is isolated from the third accommodation cavity 630 by a second membrane 624, so that the accommodation cavities are independent of each other. The first accommodation cavity 610 is formed by being enclosed with a first tank wall 611, a first fragile structure 612, a first membrane 614, and the inner wall of the housing. The first tank wall 611 and the first fragile structure are located outside the twin tank 60, and exposed outside. The first membrane 614 is located inside the twin tank 60, and isolates the first accommodation cavity 610 from the second accommodation cavity 620 to make the two accommodation cavities independent of each other. The first membrane 614 may be made of the same material as the first tank wall, or made of a different material. The first fragile structure 612 is arranged on a tank wall corresponding to the first accommodation cavity 610. When the first fragile structure 612 is ruptured, the filling substance in the first accommodation cavity 610 is released.

The second accommodation cavity 620 is formed by being enclosed with a second tank wall 621, a second fragile structure 622, the first membrane 614, a second membrane 624, and the inner wall of the housing. The second tank wall 621 and the second fragile structure 622 are located outside the twin tank 60, and integrated with the tank outer wall corresponding to the first accommodation cavity. The second membrane 624 is located inside the twin tank 60, and works together with the first membrane 614 to partition the interior space of the twin tank 60 to form an independent second accommodation cavity 620. The second membrane 624 may be made of the same material as the second tank wall, or made of a different material. The second fragile structure 622 is arranged on a tank wall corresponding to the second accommodation cavity 620. When the second fragile structure 622 is ruptured, the filling substance in the second accommodation cavity 620 is released.

The third accommodation cavity 630 is formed by being enclosed with a third tank wall 631, a third fragile structure 632, the second membrane 624, and the inner wall of the housing 210. The third tank wall 631 and the third fragile structure 632 are located outside the twin tank, and connected to the tank outer wall corresponding to the second accommodation cavity 620. The second membrane 624 is located inside the twin tank 60, and partitions the interior space of the twin tank 60 into a second accommodation cavity 620 and a third accommodation cavity 630. The third fragile structure 632 is arranged on a tank wall corresponding to the third accommodation cavity 630. When the third fragile structure 632 is ruptured, the filling substance in the third accommodation cavity 630 is released.

In the twin tank shown in FIG. 9*a*, the first membrane 610 and the second membrane 620 are arranged to partition the interior space of the twin tank 60 into three independent accommodation cavities. The three independent accommodation cavities correspond to separate fragile structures respectively. The corresponding fragile structure of each accommodation cavity possesses a different packaging strength. For example, in FIG. 9*a*, the packaging strength of the first fragile structure 612 is greater than the packaging strength of the second fragile structure 622, and the packaging strength of the second fragile structure 622 is greater than the packaging strength of the third fragile structure 632. In this way, among the corresponding fragile structures of the accommodation cavities under the action of the gas pressure in the battery cell, the filling substance in the accommodation cavity corresponding to the fragile structure with the lowest packaging strength is released first. The filling substances in the accommodation cavities corresponding to the fragile structures with relatively high packaging strengths are released stepwise when the gas pressure in the battery cell increases gradually. To be specific, the filling substance in the third accommodation cavity 630 is released first, the filling substance in the second accommodation cavity 620 is released later, and the filling substance in the first accommodation cavity 610 is released last. The packaging strength of the fragile structure may be formed by making a fragile region in a given part of the flexible material in a way such as reducing the thickness of the given part by laser etching, acid etching of aluminum, or die-cut mold scratching of aluminum. The proportion of the fragile region in the area of the entire outer wall of the tank is approximately 10% to 50%. The thickness of the fragile region is generally 10 μm to 300 μm. The pressure borne by the fragile region is less than that borne by other non-thinned regions. The thickness may differ between the fragile regions depending on the required packaging strength. The pressure threshold borne by the fragile region is positively correlated with the thickness (for example, the internal pressure threshold is 0.25 MPa when the thickness of the fragile region is 100 μm, and the internal pressure threshold is 0.4 MPa when the thickness is 200 μm). Therefore, each capsule can regulate the pressure relief order by using stepwise thicknesses of the fragile regions. The fragile regions may be arranged in various ways. Another way of forming the fragile regions is to nick a given part of the outer wall of the tank. The depth of the nick represents the packaging strength of the fragile region. The packaging strength is lower if the depth is great, and the packaging strength is higher if the depth is small.

During formation of the twin tank 60, first, the film structure of the tank wall is bonded to the inner wall of the housing by welding or gluing, and then the first membrane 614 and the second membrane 62 are arranged inside the tank wall by welding or gluing or other means. The first membrane 614, the second membrane 62, the outer wall of the tank, and the inner wall of the housing form an accommodation cavity. After the filling substance is injected into each accommodation cavity, the accommodation cavity is sealed by laser welding or other means, thereby forming a twin tank structure.

FIG. 9*b* is a schematic diagram of a twin tank 60 after independent accommodation cavities in the twin tank are filled with filling substances. The first accommodation cavity 610 is filled with a first filling substance 613, the second accommodation cavity 620 is filled with a second filling substance 623, and the third accommodation cavity 630 is filled with a third filling substance 633. The first filling substance may be the same or different. When the filling substances are the same, the same substance can be released in an orderly manner under different pressures in the battery cell. When the filling substances are different, different substances can be released in an orderly manner under different pressures in the battery cell to refill the battery cell with various desired substances.

Definitely, in order to increase the flexibility of using the twin tank, the packaging strengths of the fragile structures may be set at discretion. For example, when the number of independent accommodation cavities in the twin tank is relatively large, for example, is 5 to 9, the fragile structures corresponding to two or three accommodation cavities may be set to possess the same packaging strength, so as to increase the dosage of a substance released at a time. Alternatively, the difference in the packaging strength between the fragile structures may be reduced, so as to reduce intervals at which different accommodation cavities release the filling substance, and to refill the electrode assembly with the desired substance stepwise at dense intervals. Moreover, the capacity may be identical or different between the accommodation cavities. The capacity of each accommodation cavity may be set at discretion according to the use characteristics of the electrode assembly. The substance consumed by the electrode assembly in a large amount may be stored in a large-capacity accommodation cavity, and the substance consumed in a small amount may be stored in a small-capacity accommodation cavity. Definitely, other arrangement manners are applicable, without being limited in this embodiment of this application. By adjusting the capacity of the accommodation cavity and the packaging strength of the fragile structure at discretion, the battery cell can be refilled with desired substances more efficiently.

As can be seen from the foregoing embodiment, on the one hand, the twin tank structure is bonded to the inner wall of the housing, and the capsule structure is fitted to the inner wall of the housing, thereby saving space significantly. On the other hand, the membrane partitions the interior space of the tank into a plurality of independent accommodation cavities. Each accommodation cavity includes a corresponding fragile structure, and each fragile structure possesses a different packaging strength. In this way, this embodiment implements the function of storing different types of filling substances by using a single tank. The different filling substances stored in the accommodation cavities in the tank can be released stepwise in response to different external pressures, thereby improving pertinency of refilling the electrode assembly with the desired substances.

FIG. 10 is a schematic structural diagram of fitting a twin tank structure to the inner wall of the housing. The first twin tank 601 and the second twin tank 602 are arranged between a sidewall of the electrode assembly in the height direction and the housing. The tank wall of the twin tank may be arranged on the housing by gluing or laser welding or other means, so as to combine with the housing into a whole. Alternatively, the twin tank may be arranged in all gaps between the sidewall and the housing, so as to fill all spaces. The third twin tank 603 is arranged corresponding to a sidewall of the electrode assembly in the height direction, and located at the bottom of the housing of the battery cell. The fourth twin tank 604 is arranged corresponding to a sidewall on the top of the electrode assembly in the height direction. At the corner of the housing, a twin tank may be arranged, or, for convenience, a fifth discrete tank 605 may be arranged instead. When the twin tank is arranged on the top of the electrode assembly in the height direction, the substance released by the tank permeates into an electrode core of the electrode assembly more easily due to gravity, thereby improving the effect of electrolyte refilling.

Figures 11, 12:
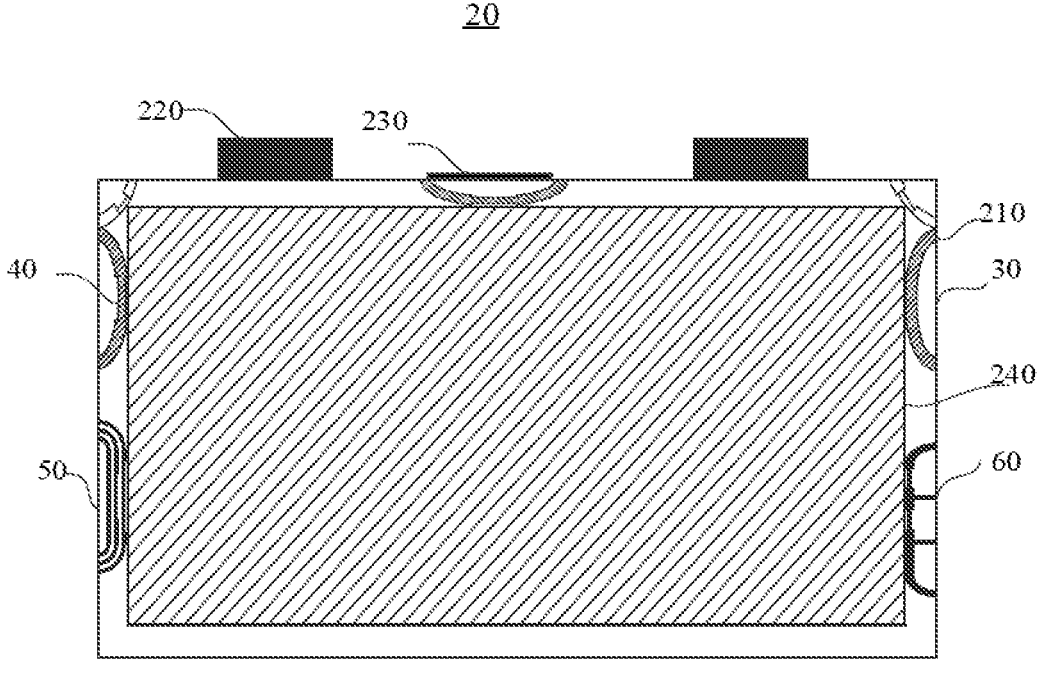
FIG. 11 is a schematic structural diagram of another battery cell according to an embodiment of this application.
FIG. 12 is a schematic diagram of a fragile structure according to an embodiment of this application.

In this embodiment of this application, further, as shown in FIG. 11, the parent-child tank 50, the twin tank 60, the discrete tank 40, and the capsule structure 30 may be arranged compositely in the battery cell, each being fitted to the inner wall of the housing. As shown in FIG. 11, a discrete tank 40 and a parent-child tank 50 are arranged between a sidewall at one end of the electrode assembly in the height direction and the housing 210, and a capsule structure 30 and a twin tank 60 are arranged between a sidewall at the other end of the electrode assembly in the height direction and the housing 210. The discrete tank 40 and the capsule structure 30 each are a capsule structure with a single separate accommodation cavity. With only one accommodation cavity, a discrete tank can store a larger amount of a substance than a twin tank 60 or parent-child tank 50 of the same size. Therefore, arranging the capsule structure 30, the discrete tank 40, the twin tank 60, and the parent-child tank 50 compositely can meet a requirement of supplementing a substance in large amounts. For example, during the use of the electrode assembly, the electrolytic solution is most consumed over time. Therefore, the electrolytic solution may be stored in the discrete tank 40, and other substances may be stored in the twin tank 60 and the parent-child tank 50. At the corner of the housing, the tanks may also combine with two or three adjacent inner sidewalls of the housing to form the capsule structure. Such a combination diversifies the ways of refilling the electrode assembly with substances.

The capsule structure with a plurality of accommodation cavities is fitted on the inner wall of the housing of the battery cell, thereby implementing the function of storing different types of filling substances by using a single capsule structure. The different filling substances stored in the accommodation cavities in the tank can be released stepwise in response to different external pressures, thereby improving pertinency of refilling the electrode assembly with the desired substances. Moreover, with the twin tank and the parent-child tank arranged compositely inside the battery cell, the electrode assembly can be refilled with substances precisely and meticulously.

In some embodiments, as shown in FIG. 8, FIG. 10, and FIG. 11, in order to improve the effect of infiltration, in this embodiment of this application, the fragile structure of the tank is arranged corresponding to the sidewall of the electrode assembly. That is, the fragile structure fits closely with the outer wall of the electrode assembly. No matter whether the structure is a discrete tank, a parent-child tank, or a twin tank, the filling substance stored in the accommodation cavity in the tank overflows from the fragile structure. With the fragile structure arranged corresponding to the sidewall of the electrode assembly, the filling substance can contact the sidewall of the electrode assembly first, thereby improving the effect of infiltration. For the tank arranged at one end of the electrode assembly in the height direction, the fragile structure closely fits with a tab part of the electrode assembly downward. When the fragile structure is ruptured, the overflowing filling substance infiltrates the interior of the electrode assembly more easily due to gravity.

In some embodiments, each fragile structure of the capsule structure possesses a different packaging thickness. To release the filling substances from different accommodation cavities stepwise, this application assigns a different packaging strength to the fragile structure corresponding to each different accommodation cavity. In this way, among the corresponding fragile structures of the accommodation cavities under the action of the internal pressure of the battery cell, the filling substance in the accommodation cavity corresponding to the fragile structure with the lowest packaging strength is released first. The filling substances in the accommodation cavities corresponding to the fragile structures with relatively high packaging strengths are released stepwise when the gas pressure in the battery cell increases gradually. The packaging strength of the fragile structure may be formed by making a fragile region in a given part of the flexible material in a way such as reducing the thickness of the given part by laser etching, acid etching of aluminum, or die-cut mold scratching of aluminum. The proportion of the fragile region in the area of the entire outer wall of the tank is approximately 10% to 50%. The thickness of the fragile region is generally 10 μm to 300 μm. The pressure borne by the fragile region is less than that borne by other non-thinned regions. The thickness may differ between the fragile regions depending on the required packaging strength. The pressure threshold borne by the fragile region is positively correlated with the thickness (for example, the internal pressure threshold is 0.25 MPa when the thickness of the fragile region is 100 μm, and the internal pressure threshold is 0.4 MPa when the thickness is 200 μm). Therefore, each capsule can regulate the pressure relief order by using stepwise thicknesses of the fragile regions.

In some embodiments of this application, the fragile structure is nicked to different depths. The fragile regions may be arranged in various ways. As shown in FIG. 12, another way of forming the fragile regions is to nick a given part of the outer wall of the capsule structure. The depth of the nick represents the packaging strength of the fragile region. The packaging strength is lower if the depth is great, and the packaging strength is higher if the depth is small.

In some embodiments, the packaging strengths of the fragile structures change stepwise. In order to adapt to the pressure in the battery cell and release the filling substances in the accommodation cavities in the capsule structure stepwise in batches, in view of the characteristics of the internal pressure of the electrode assembly and the substances required by the electrode assembly in different pressure stages, this application arranges the packaging strengths of the corresponding fragile structures of the accommodation cavities to change stepwise, so as to gradually release the substances required by the electrode assembly.

In some embodiments, each accommodation cavity stores a different substance. As described in the foregoing embodiments, the accommodation cavities may store different substances according to the substances required by the electrode assembly at different stages, for example, may store lithium supplementing agent, flame retardant, electrolytic solution, component/gas absorbent, metal capturing agent, and the like. The release of stored substances achieves the purposes of improving longevity and safety of the electrode assembly.

Definitely, the accommodation cavities of the capsule structure may store the same substance, such as electrolytic solution. The electrolytic solution is sufficient in an early stage of the lifecycle of the battery. When the aging of the battery aggravates and the electrolytic solution keeps being consumed over time, side reaction products gradually accumulate and the internal gas pressure keeps rising. The corresponding fragile regions are ruptured stepwise in ascending order of thickness of the fragile regions when the internal pressure keeps increasing (that is, when the aging keeps aggravating). The regions release the electrolytic solution in sequence, thereby overcoming a cycle capacity plunge caused by lithium plating arising from insufficient electrolyte circulation.

In some embodiments of this application, the accommodation cavities store a flame retardant, a gas absorbent, a lithium supplementing agent, and an electrolytic solution respectively in descending order of the packaging strength of the fragile structure. Problems such as lack of electrolytic solution and lithium ions usually occur over time when the electrode assembly is in use. At a later stage, the problems such as increased amount of gas generated in the battery and increased fire hazards are more prone to occur. In this embodiment of this application, the foregoing hazards are resolved in a pertinent manner. The electrode assembly is refilled with the electrolytic solution, lithium supplementing agent, gas absorbent, and flame retardant separately.

In a case that the electrolytic solution is severely consumed at the middle and later stages of the lifecycle, the electrolytic solution is supplemented in time to enhance the effect of infiltration for electrode plates, avoid central lithium plating caused by insufficient electrolyte circulation, and improve an end-of-line test (EOL) capacity retention rate and longevity, power performance, fast charge capability, and the like. Therefore, the electrolytic solution and lithium ions need to be supplemented in large amounts. In addition, the amount of gas generated in the electrode assembly in use increases significantly over time. In this case, the tanks can release a gas hardener/absorbent (such as CaO) to harden and absorb the gas (such as $CO_2$) in the electrode assembly, thereby achieving the effects of EOL degassing and internal pressure relief, and reducing the risk of the explosion-proof valve bursting open. At the later stage of the lifetime of the electrode assembly, when lithium dendrites pierce a separator or thermal runaway ultimately occurs in an abuse test due to defects of the electrode assembly at the end of life, the pressure surges up instantaneously and reaches a packaging strength threshold of the fragile structure that possesses the maximum packaging strength. In this case, the flame retardant needs to be released to implement rapid cooling, control the severity of thermal runaway, and improve safety performance.

According to some embodiments of this application, a battery is further disclosed. The battery includes any one of the battery cells mentioned in the foregoing embodiments. A capsule structure is arranged on the inner wall of the housing of the battery cell. An accommodation cavity is arranged inside the capsule structure, and the accommodation cavity can store a filling substance. The capsule structure fitted to the housing saves the space inside the battery cell greatly, and improves the efficiency of refilling the electrode assembly with substances. Further, each capsule structure may store one or more substances required by the electrode assembly. Therefore, the same substance or different substances in the electrode assembly can be released stepwise in view of a pressure inside the electrode assembly that is in use or in different aging states. For the electrode assembly at different stages, different dosages of electrolytic solution or different types of desired substances are provided, thereby improving pertinency of refilling the electrode assembly with substances.

According to some embodiments of this application, an electrical device is further provided. The electrical device includes the battery disclosed in the foregoing embodiment, and the battery is configured to provide electrical energy for the electrical device. The electrical device may be, but without being limited to, a mobile phone, a tablet, a notebook computer, an electric toy, an electric tool, an electric power cart, an electric vehicle, a ship, a spacecraft, and the like. The electric toy may include stationary or mobile electric toys, such as a game console, an electric car toy, an electric ship toy, an electric airplane toy, and the like. The spacecraft may include an airplane, a rocket, a space shuttle, a spaceship, and the like.

Finally, it needs to be noted that the foregoing embodiments are merely intended to describe the technical solutions of this application, but not to limit this application. Although this application is described in detail with reference to the foregoing embodiments, a person of ordinary skill in the art understands that modifications may still be made to the technical solutions described in the foregoing embodiments or equivalent replacements may still be made to some technical features thereof, without making the essence of the corresponding technical solutions depart from the spirit and scope of the technical solutions of the embodiments of this application.

What is claimed is:

1. A battery cell comprising:

a housing and an electrode assembly, wherein:

the electrode assembly is accommodated in the housing;

a plurality of film structures are arranged, independent of each other, between the housing and the electrode assembly at different locations of inner walls of the housing and facing the electrode assembly;

each film structure combines with a respective inner wall of the housing to form a respective capsule structure, wherein a respective accommodation cavity is formed inside each capsule structure;

a respective fragile structure is arranged on a surface of each capsule structure, wherein each fragile structure is a nick on the surface of the corresponding capsule structure;

each fragile structure has a packaging strength that is different relative to the other respective fragile structure packaging strengths; and in a descending order of the packaging strengths of the fragile structures, the accommodation cavities store a flame retardant, a gas absorbent, a lithium supplementing agent, and an electrolytic solution, respectively.

2. The battery cell according to claim 1, wherein each capsule structure is arranged at a position located on the respective inner wall of the housing and opposite to a respective sidewall of the electrode assembly.

3. The battery cell according to claim 1, wherein an explosion-proof valve is arranged on the housing, and one of the plurality of capsule structures is arranged at a position located on the respective inner wall of the housing and opposite to the explosion-proof valve.

4. The battery cell according to claim 1, wherein at least one of the plurality of capsule structures is formed by combining the corresponding film structure with two or three adjacent inner walls of the housing.

5. The battery cell according to claim 1, wherein the respective fragile structure arranged on the surface of the corresponding capsule structure faces the electrode assembly.

6. The battery cell according to claim 1, wherein a membrane is arranged in each capsule structure, and the membrane is configured to partition a respective accommodation cavity in the capsule structure into a plurality of independent sections of the accommodation cavity.

7. The battery cell according to claim 1, wherein each fragile structure has a packaging thickness, that is different relative to the other respective fragile structure packaging thicknesses.

8. The battery cell according to claim 1, wherein each nick cuts into the surface of the corresponding capsule structure to define a depth that is different relative to the other respective nicks of the other capsule structures.

9. The battery cell according to claim 1, wherein the different packaging wherein the respective packaging strengths of the fragile structures vary stepwise relative to one another.

10. A battery, comprising the battery cell according to claim 1.

11. An electrical device, comprising the battery according to claim 10, wherein the battery is configured to provide electrical energy to the electrical device.

* * * * *